Patented May 5, 1931

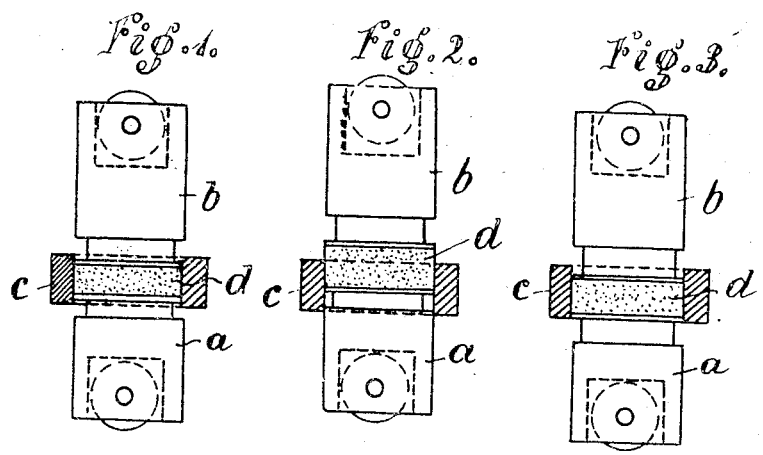
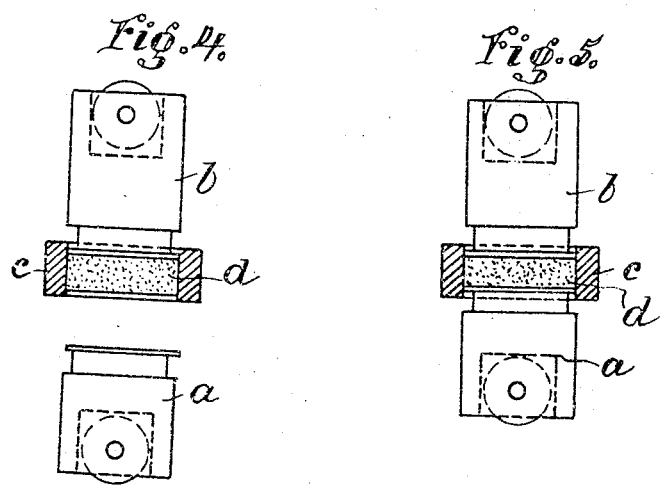
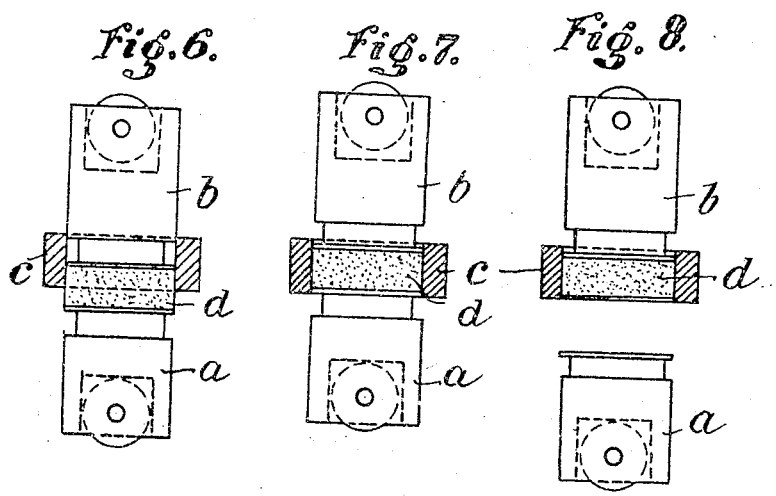

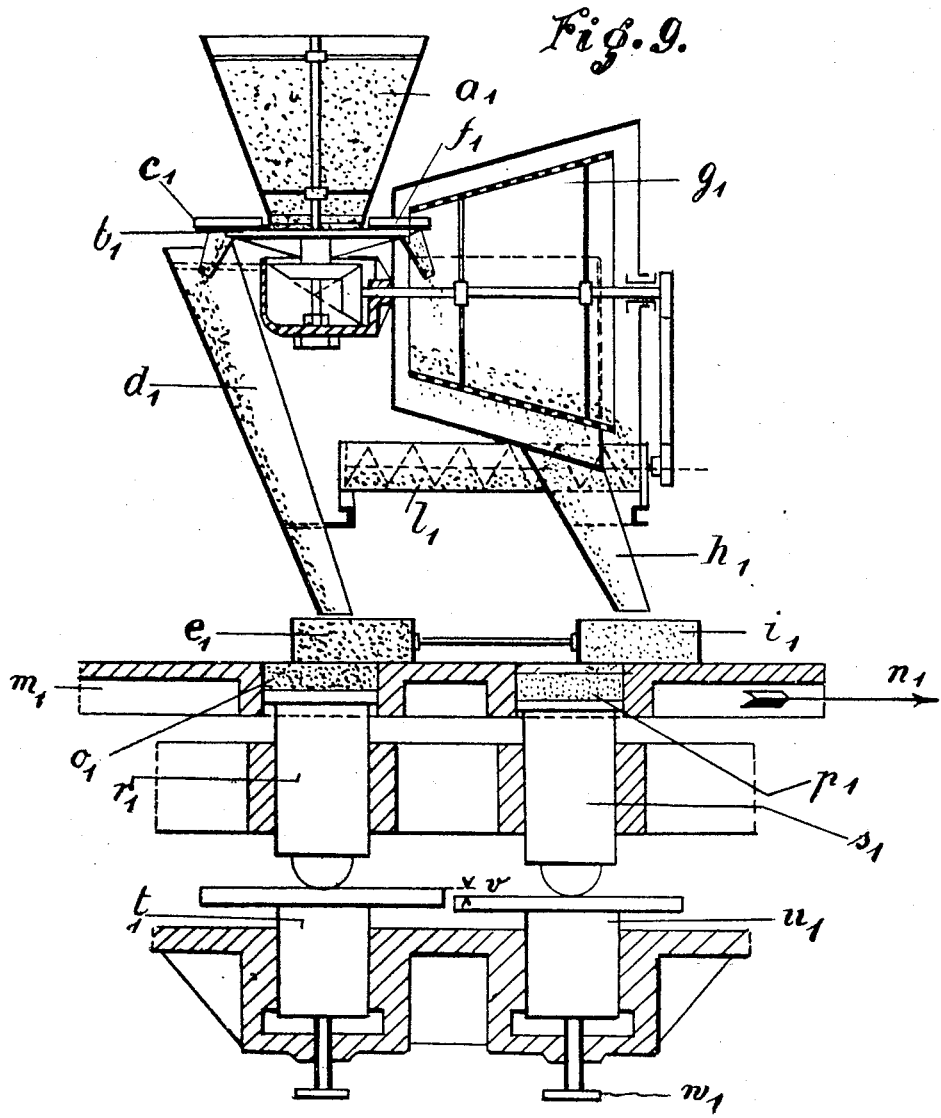

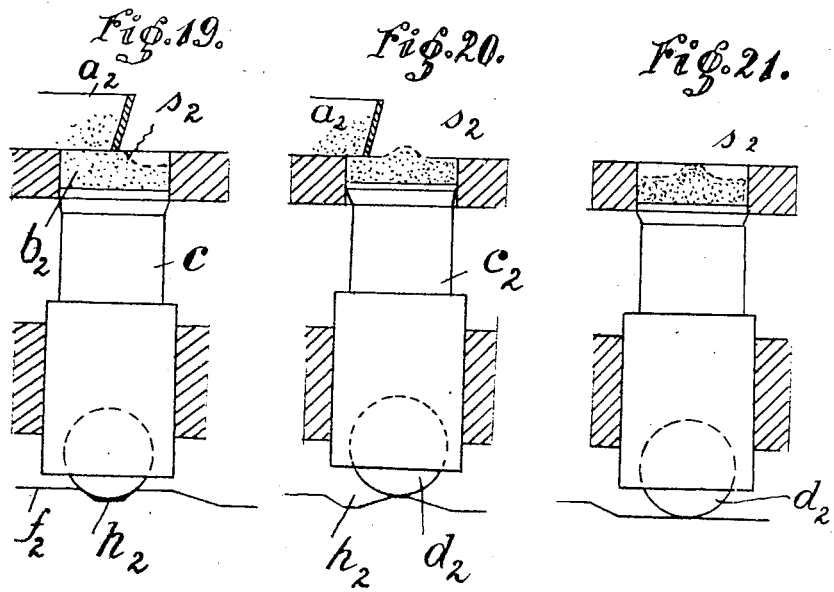
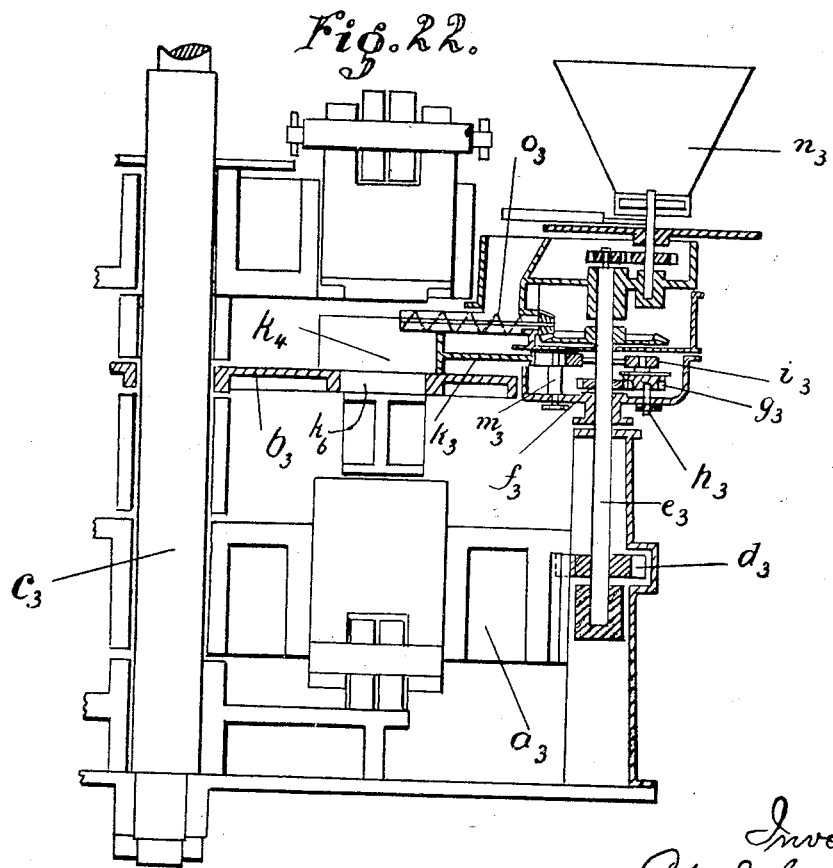

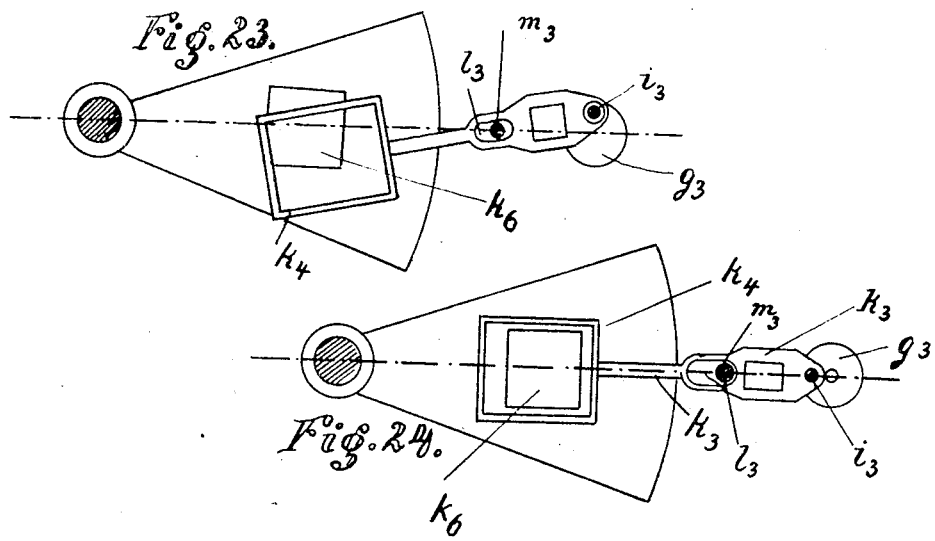
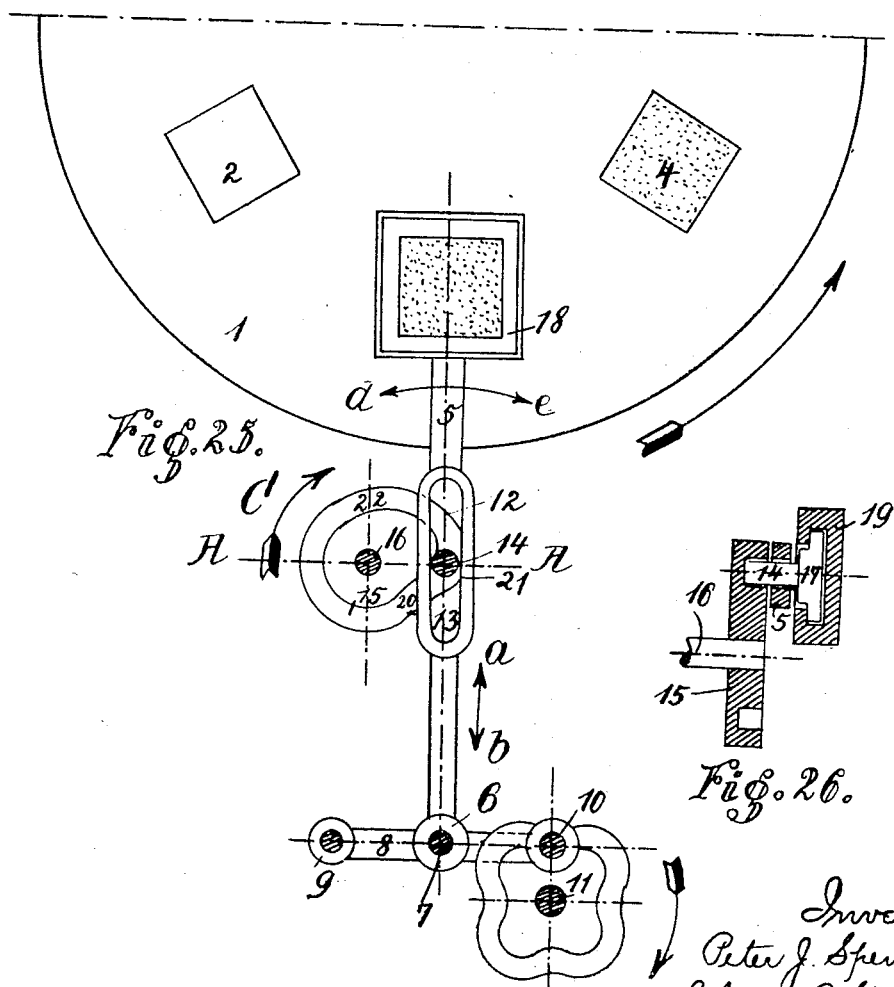

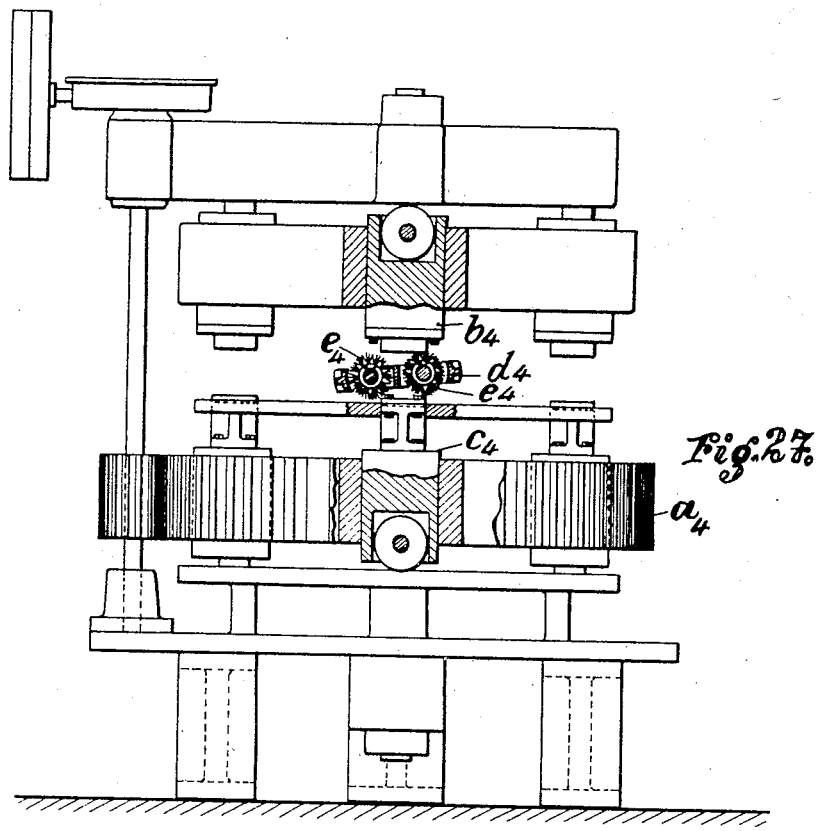
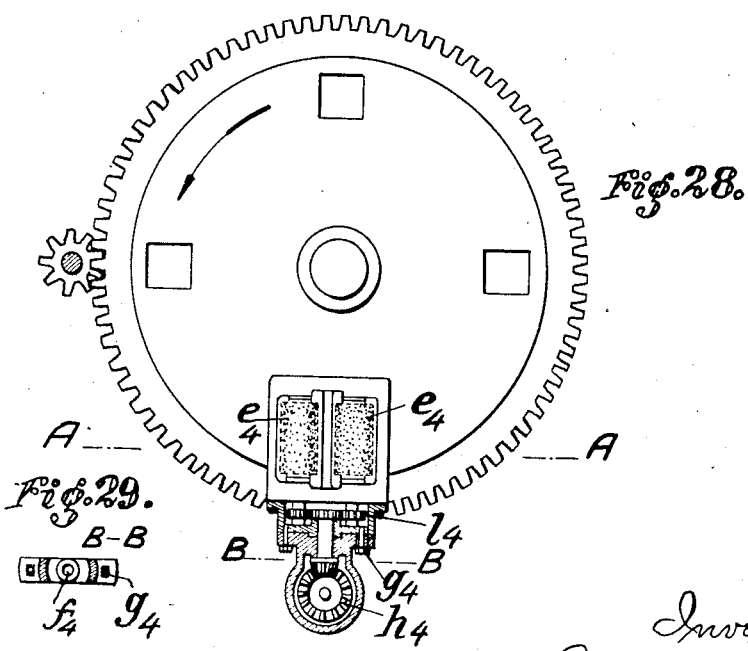

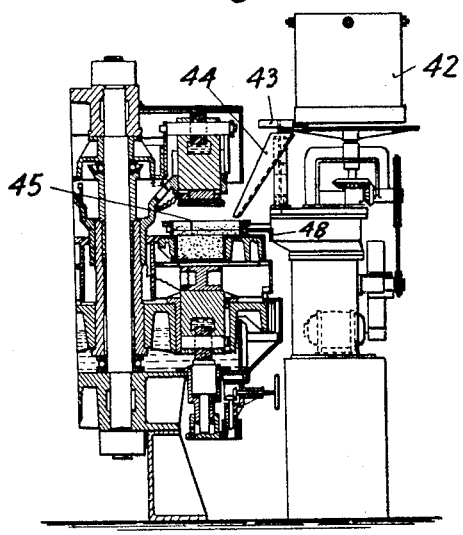
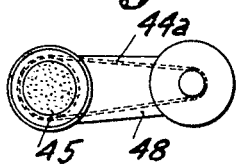
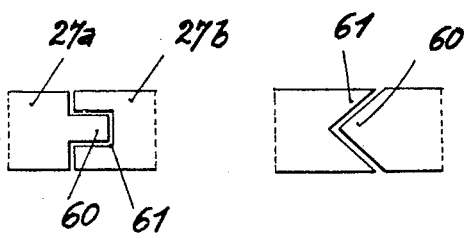

1,803,814

UNITED STATES PATENT OFFICE

PETER JOSEPH SPENGLER AND JOHANN PETER SPENGLER, OF OSTSWINE, NEAR SWINEMUNDE, GERMANY

PROCESS OF AND APPARATUS FOR PRODUCING PRESSED BODIES OF POWDEROUS MATERIAL

Application filed August 23, 1928, Serial No. 301,581, and in Germany January 11, 1926.

This invention relates to a process of and apparatus for producing pressed bodies of powderous material of any kind, for example clay or the like, for the manufacturing of stones or plates or coal for the production of coal briquettes on rotary table presses. The pressed bodies may be made of one or several layers of any powderous material of similar or different grain size on rotary table presses. The characteristic of the pressing process and of the rotary table press, serving for carrying out the process, is that the air contained in the powderous mass is, during the pressing completely removed so that pressed bodies up to the greatest dimensions can be made without air fissures. The mass to be pressed is brought into the moulds of the rotary table with the aid of charging devices at accurately uniform height during the rotation of the table so that the uniform structure of the moulded bodies is obtained. If profile stones, wedge stones and the like have to be made the pressing mass is filled into the moulds in accordance with the shape of the bodies to be produced, so that when pressed a uniform compression of the mass in all layers is obtained. The materials, for example clayey raw substances, are heated for crushing them to proper size and to such high temperature, for instance above 200° C. or between 400 and 600° C., so that they loose their natural mouldability.

The preparation of the mass is preferably carried out in such a manner that it is first ground stepwise to different grain sizes up to perfect fineness, the material of different grain sizes being moistened after every grinding step.

If moulded bodies are made from several layers of different fineness, for example of ceramic masses, a portion of the material is separated by screening and brought onto the unscreened mass which has been first filled in through the charging hole.

In order to obtain a uniform moistening of all layers of the material designed to be used for dry pressing it is advisable to grind the material stepwise to different grain sizes up to perfect fineness, the different grain sizes being specially and separately moistened between every two successive grinding steps.

The moistening of the dry material has been carried out hitherto by pouring into the crushing machine, vertical mill-stones or the like, during the crushing a certain quantity of water. In this manner the material was moistened, but numerous grains and dust particles remained dry and others became too moist, so that it was impossible to obtain by this working method a uniform moistening throughout.

The invention has for its object to improve the moistening method so that all grains and dust particles are uniformly moistened. This method is carried out as follows:—

The dry material to be ground to powder is first preliminarily ground to a grain size of for instance 15 to 20 mms., whereupon to this preliminarily ground material contained in a mixing screw, a drum or the like, a portion of the moisture necessary for the pressing is added. The thus prepared material is then ground in a second edge runner or crushing machine for example to a grain size of 6 to 8 mms., and in a moistening drum, mixing screw or the like a further portion of the moisture or the remainder of the same is added which is necessary for the pressing, the material being then ground in a third edge runner or crushing machine to the powder ready for pressing. By this method a sure uniform moistening of all particles of the powder is obtained. The same is valid for any finer graining.

The preparation of the raw material, as for instance clay, for the dry pressing might also be carried out in the following manner:

When the pressing of powderous almost dry clays or earths, containing only about 5 to 7% moistness, it happens that in the pressed bodies, after the pressing, i. e. when being removed from the mould, very often fissures are formed, this being also the case with subsequent slow drying in drying plants or in the burning oven. This formation of fissures is due to the fact that, owing to the plasticity of the material to be compressed, the pressed bodies become slightly larger after the ejection, so that the fissures are either formed immediately or eventually at subsequent heating.

Only by removing the plasticity of the clays, earths and the like to be treated, is it possible to prevent formation of fissures in order to obtain goods absolutely free from fissures.

According to the invention the clayey raw materials to be treated by dry pressing are deprived of their mouldability, prior to the pressing. This is done by heating them to such a temperature that the strong binding capability and fattiness, which the mouldable clay possesses by nature, is destroyed. As a rule temperatures above 200° C. are sufficient for this purpose. One may, however work also between 400 and 600° C. The heating temperature suitable in every individual case depends on the special behaviour of the clayey substance.

Eventually a small quantity of alkaline substances, caustic alkali, alkali carbonate, potassium or sodium silicate and the like, is added at the grinding or to the mixing water required for the pressing.

The details of the method, the rotary table press serving for carrying out the method and other arrangements will be hereafter described in connection with the accompanying drawing. The de-aerating of the pressed body is effected, after the preliminary pressing of the mass in the moulds of the rotary table, which moulds work with upper and lower rams, by ejecting them out of the mould so far that their lateral surfaces, or a portion of the same, become free so that the air can escape to all sides and a more rapid and complete removing of the air from the moulds is obtained, whereupon the final pressing is done.

The de-aerating can take place only after the first preliminary pressing or also after every subsequent pressing.

Figures 1–8, show diagrammatically the operation in successive stages;

Fig. 9 is a vertical section of a press and the mechanism for stratifying the product;

Figs. 10–21 show various mechanisms for unequally filling the moulds to obtain brick or tile of non-uniform thickness but of uniform density throughout;

Fig. 22 is a vertical section showing a press and its mould filling mechanism;

Figs. 23 and 24 are plan views in different positions of the mould filling device;

Fig. 25 is a modified mechanism for filling the moulds;

Fig. 26 is a section on line A—A, Fig. 25;

Fig. 27 is an elevation partly in section and

Fig. 28 is a plan provided with a brushing mechanism for the filled mould;

Fig. 29 is a section on line B—B of Fig. 28;

Fig. 30 is a vertical section of a press having movable mould filling devices;

Fig. 31 shows the drive for the filling devices;

Figs. 34 and 35 show details of the cam track.

Referring to Figs. 1 to 8—

Figure 10:
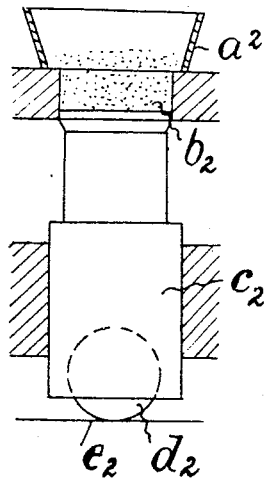

In the accompanying drawings a pressing mould $c$ with lower ram $a$ and upper ram $b$ is diagrammatically shown, the mass to be pressed being designated by $d$. Fig. 3 shows a position of the rams $a$ and $b$ after the preliminary pressing. Fig. 2 shows how the lower ram $a$ presses the compressed powderous material $d$ together with the upper ram $b$ out of the mould $c$ in upward direction. At this proceeding all the air contained in the pressing material can escape on all sides of the pressed body as soon as it has come out of the mould. The pressed body can be lifted from the mould to any desired height, Fig. 1 shows the tightly compressed body in the mould $c$, while Fig. 4 illustrates the beginning of the upward ejection of the finished moulded body. Figs. 5 to 8 illustrate the above described pressing operation with the difference that, as can be seen from Fig. 6, the de-aerating takes place in downward direction and not in upward direction as shown in Fig. 2.

The operation is as follows:

After the pressing mould $c$ has been filled with powderous material the upper ram $b$ penetrates into the mould and compresses the powderous material in accordance with the weight of the upper ram or in accordance with the pressure acting on this ram. At this proceeding part of the air contained in the powderous material escapes. The escaping of the air ceases however at the moment when the intervals between mould $c$ and lower ram $a$ and upper ram $b$ are filled with material. After this preliminary pressing from above by the ram $b$, a second pressing from below by the ram $a$ takes place. The pressure produced by the ram $a$ is higher than that produced by the ram $b$. The ascending ram $a$ lifts therefore the preliminarily compressed powderous material together with the ram $b$ out of the pressing mould $c$ until a portion of the compressed body becomes free so that the air can freely escape to all sides (see Figs. 2 and 6). The lower ram $a$ returns then, as shown in Fig. 1, into its initial position in the mould and the maximum pressure is exerted by the upper ram $b$, whereby to the compressed body a predetermined hardness and thickness is given and the same is finally ejected (Fig. 6).

In the arrangement for de-aerating pressed bodies shown in Figs. 1 to 8 ordinary stones and plates are illustrated. Profiled stones, wedge stones, stones with bosses, projections or the like on the surface may however be produced, for which not only a de-aerating in the manner described takes place, but moulded bodies with structure of uniform density are produced. This is obtained by filling the pressing mass into the mould and by compressing the same in accordance with the form of the bodies to be produced.

If wedge-shaped stones have to be produced, the mass is distributed in the mould in wedge-shape or, if stones with projections have to be produced pressing mass is heaped on the points where the projections have to be. The process, to distribute the pressing mass in accordance with the shape of the moulded body, is carried out by giving to the slide on which the lower ram moves, the shape of the surface of the moulded body to be produced. After the mould on the rotary table has been filled and this table has been further rotated underneath the pressing mould, the desired shape is given to the surface of the pressed body by the pressing mould in combination with the lower ram moved in a special manner.

Figs. 10 to 13 show vertical sections through a mould with filling box and lower ram with guide path for the production of wedge-shaped stones in the different phases.

Fig. 10 shows the position in which the charging box $a_2$ stands directly above the mould opening $b_2$, the mould being filled with material. The roller $d_2$ of the lower ram $c_2$ moves over the plane portion of the path $e_2$.

Figure 11:
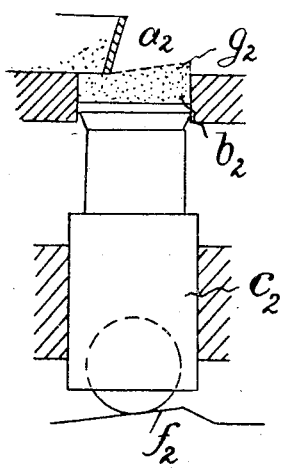

Fig. 11 shows the position in which the mould $b_2$ in the rotary table has moved a certain distance underneath the charging box $a_2$. The lower ram $c_2$ ascends on the incline $f_2$ to raise the pressing material according to the height of the incline at the further inclination of the table underneath the charging box $a_2$ out of the mould $b_2$, so that an inclined surface is produced. The formation of the wedge-shaped form of the moulded mass $g_2$ can be seen.

Figure 12:
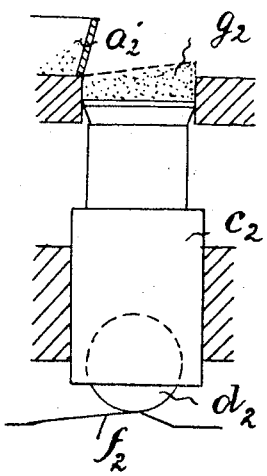

Fig. 12 shows the ram $c_2$ in the highest position. The pressing mass is distributed, according to the shape of the wedge-shaped moulded body, partly in and partly above the mould.

Figure 13:
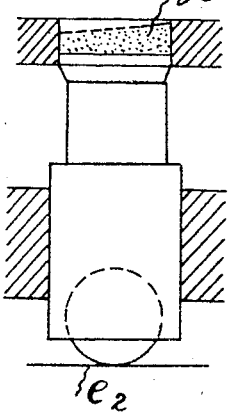
Figure 14:
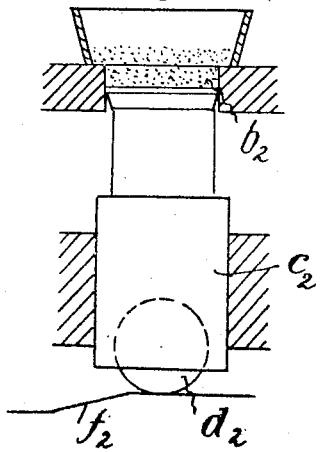
Figure 15:
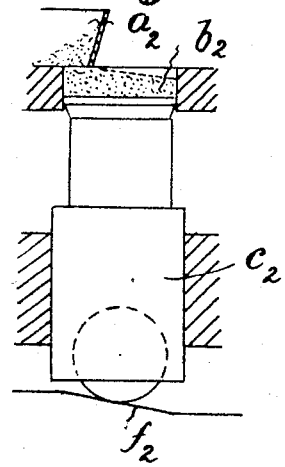
Figure 16:
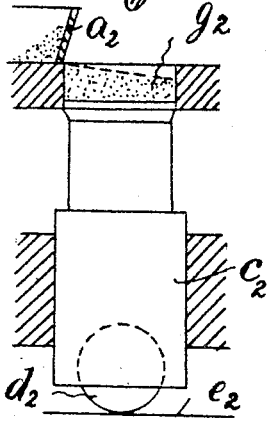
Figure 17:
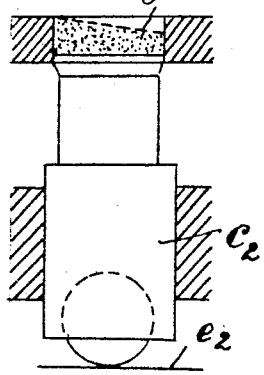

In Fig. 13 the ram $c_2$ has arrived again on the plane path $e_2$ and the mass $g_2$ is entirely in the mould so that the compressing by the upper ram, not shown, can take place.

In Figs. 14 to 17 the just described arrangement is shown with a guide path $f_2$ inclined in opposite direction, so that no further description is required.

In Figs. 18 to 21 the guide path is of a shape designed to produce a stone with a projection at the middle.

Figure 18:
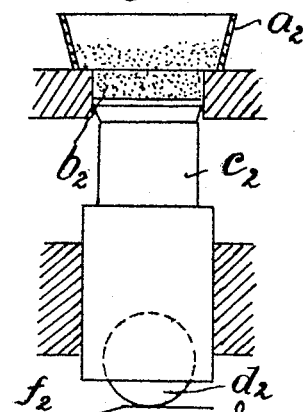

Fig. 18 shows the charging box $a_2$ above the filled mould $b_2$.

In Fig. 19 the lower ram $c_2$ has arrived in the deep place $h_2$ of the guide path. The formation of the ridge $s_2$ has begun.

Fig. 20 shows the position, in which the rotary table has further rotated, so that the completed ridge $s_2$ is freely accessible. The roller $d_2$ of the lower ram $c_2$ has got out of the indentation $h_2$.

In Fig. 21 the lower ram $c_2$ begins to descend. The shaped pressing mass resting on it sinks back into the mould; in this extreme position the compressing takes place by an accordingly shaped upper ram, not shown.

If moulded bodied have to be produced from several layers of mass of different fineness, the production is carried out by screening a portion of the pressing material and pouring the same onto the unscreened pressing material which has first been filled through the mould opening. The arrangement shown in Fig. 9 serves for charging the masses of different fineness into the moulds of the rotary table press.

The unscreened mass or pressing material is in a charging hopper $a_1$, arranged above the press with a rotary mould table $m_1$. Under the charging hopper a rotating plate plate $b_1$ with scrapers $c_1$ and $f_1$ is arranged, the scraper $c_1$ conveying the mass through the gutter $d_1$ into the charging box $e_1$ arranged above the rotary table $m_1$. The other scraper $f_1$ conveys also a portion of the pressing mass to the rotating screener, for example a sieve drum $g'$ with perforated wall. The material, which has passed through the sieve $g_1$, is conveyed through a gutter $h_1$ into a second charging box $i_1$, whilst the coarse material, having not passed through the sieve $g_1$, drops into a gutter comprising a conveying screw $l_1$, which conveys the same to the gutter $d_1$, leading to the charging box $e_1$. The arrangement may however be made in such a manner, that the coarse mass is conducted to the charging box $e_1$. In the rotary mould-table $m_1$, which rotates in the direction of the arrow $n_1$, mould openings $o_1$ and $p_1$ are arranged. The lower press rams $r_1$ and $s_1$ run by means of rollers on guide rails $t_1$ and $u_1$ adapted to be adjusted in vertical direction by means of screw spindles $w_1$ or lever mechanism, in order to obtain different filling-heights.

The operation of the apparatus is as follows:—

At the rotation of the rotary table $m_1$ in the direction of the arrow the mould opening $o_1$ gets first under the charging box $e_1$, so that it is filled with pressing mass. If the rotation of the mould table $m_1$ continues, the press ram $s_1$ drops from the higher guide rail $t_1$ upon the slightly lower rail $u_1$, whereby the filling height of the mould $o_1$ is increased the difference of height $v$ between the two rails $t_1$ and $u_1$, so that above the first charged mass a free space for the mass to be charged subsequently is produced. The rotation of the mould table continuing, the mould opening $p_1$ gets under the charging box $i_1$ containing fine or coarser pressing mass, with which the free space in the mould is completely filled.

In this manner pressed bodies of any form are made from a mass of two different grain-sizes with equal percentage of moistness.

In presses with rotary mould table it easily happens that the moulds are filled irregularly, as by the rotating table the material to be pressed is pushed towards the charging box and towards one side of the pressing mould. By the irregular filling the pressed bodies become harder at the point, where the largest quantity of mass is situated in the mould than on the other points.

According to the invention a charging device is used, by means of which it is possible, to fill the moulds of the mould table to accurately uniform height.

At the strewing of pressing material into the mould it is important that the strewing is quite uniform. This can however not be obtained with charging boxes which are moved in straight line over the mould, as the surface is covered always only in one direction. This arrangement will fail specially if certain sieve holes are clogged. This inconvenience is avoided according to the invention, if the charging boxes execute above the moulds in the table a curve-shaped, for instance an elliptic movement returning into itself, as then a transverse movement of the charging box is added, whereby at the same time, a better shaking of the pressing material is obtained which facilitates the dropping through of the material so that this material is uniformly distributed on the pressing mould towards all sides.

In Figs. 22–24 this arrangement is shown by way of example.

Fig. 22 shows in vertical section the arrangement of the charging device on the press, and Figs. 23 and 24 illustrate the driving mechanism for the charging box in two different positions in top plan view.

The driving table $a_3$, which has teeth in its circumference, and the mould table $b_3$ rotate around the stationary column $c_3$ of the press. With the teeth of the driving table $a_3$ meshes a spur wheel $d_3$ fixed on a vertical shaft $e_3$. On the vertical shaft $e_3$ a spur wheel $f_3$ is further keyed which meshes with a spur wheel $g_3$. The spur wheel $g_3$ rotates around a stationary stud $h_3$ and has on its end a crank pin $i_3$, which engages with the driving lever $k_3$ of the charging box $k_4$ and imparts to the same the necessary movement. The lever $k_3$ has at the middle portion a slot $l_3$, with which engages a stud $m_3$. At the rotation of the spur wheel $g_3$ an elliptic movement is imparted to the charging box $k_4$ through the crank pin $i_3$ and through the intermediary of the slot $l_3$ and of the stud $m_3$.

The pressing material drops through the charging hopper $n_3$ into a conveyor screw $o_3$ and is conveyed by the same to the charging box $k_4$. The opening of the mold is designated by $k_6$.

The operation is as follows:—

By the rotation of the driving table $a_3$ the spur wheel $d_3$ with the shaft $e_3$ and the spur wheel $f_3$ are rotated. The spur wheel $g_3$ with the crank pin $i_3$ is also rotated so that the charging box $k_4$ carries out with the aid of the slot guide of the driving lever $k_3$ above the rotating mould table $b_3$ or above the mould an elliptic movement. The pressing material contained in this charging box $k_3$ is therefore strewn continually over the mould, so that the mould must be uniformly filled. Fig. 23 shows the charging box $k_4$ in a lateral extreme position, Fig. 24 showing the position of the charging box perpendicularly above the mould.

Instead of imparting to the charging box above the mould table a curve-shaped movement for instance an elliptic movement returning into itself, in order to obtain uniform strewing in the moulds, the arrangement might be made so that the reciprocating charging box carries out in the direction of rotation of the mould table a more rapid movement than in the opposite direction.

In the front part of the moulds of the rotary table (viewed in the direction of rotation) slightly more material is generally heaped than on the opposite side. In order to cause an equalization at the strewing, means are provided by which the movement of the charging box in the direction of rotation of the table is carried out more rapidly than in the opposite direction of rotation. The charging box is thereby moved more rapidly over that point of the mould where more material is heaped so that less material is strewn on this point than at the opposite side, at which the charging box moves slower over the mould and consequently more material is strewn.

According to the invention the reciprocating movement of the charging box in the direction of rotation of the mould-table is effected by a disc having different curves, the movement of the charging box in axial direction being controlled by a cam-disc $s$ in Figs. 25 and 26.

The mould table 1 has mould apertures 2, 3 and 4. Above these apertures the charging box 18 is arranged which is fixed to an arm 5. This arm 5 is hingedly mounted to a lever 8 oscillating around a bolt 9, said lever carrying at its end a roller 10 running on a cam disc 11. To the lever 8 and up- and downward movement is thereby communicated, so that the lever 5 hingedly connected to the same together with the charging box carries out a reciprocating movement in axial direction. The lever 5 has a guide slot 13 with which engages a stud 14. This stud is guided by a curve disc 15 having a curved groove 12, the pivot point of which is 16. The stud 14 is fixed in a carriage 17 guided in a guide piece 19, a reciprocating movement being produced by the curve disc 15. The guide piece with the carriage 17 is not shown in Fig. 25, the curve-disc 15 being merely indicated by the groove.
By the rotation of the cam disc 11 a reciprocating movement is communicated by lever 8 to the arm 5 and charging box 18 in the direction $a—b$ axially to the mould table 1. By the rotation of the curved disc and slotted link 13 a reciprocating movement in the direction of the arrow line $d—e$ is communicated to the arm 5 hingedly mounted on the oscillatory lever 8 and to the charging box 18. The curve-disc 15 rotating in the direction of the arrow line is of such large shape that the portion 20—21 of the curve is steeper than the portion 21—22. Consequently the charging box 18 is moved to and fro over the mould openings at different speeds.

In the Figs. 30 and 31 another construction of the charging box is shown which is arranged close above the mould and to which a rotating movement is communicated. The pressing material is conveyed from the container 42 by means of a scraper 43 and gutter 44 into a charging frame 45 rotated by belt, chain 44$a$ or the like. This charging frame is mounted on a stationary arm 48 and is preferably slightly larger than the mould in the rotary table. The driving of the charging frame 45, which is almost completely filled with pressing material, is effected by belts or chains. By the rotating charging frame, the pressing material is conveyed slowly and uniformly to the mould and distributed in the mould. In order to agitate more or less the mass in the charging frame bars can be fixed in this frame.

The rotary table press described is further fitted with a cleaning device for the upper and lower rams. According to the invention rotating cylindrical brushes arranged between the rams are used for removing from the ram faces the material and dust adhering to the same. At the rotating of the table plate the rams move over the brushes and are cleaned.
The brushes are mounted in a frame, oscillatable around studs and having means for securing it in its position for the purpose, to readjust the worn brushes accordingly, i. e. to bring them closer to the ram faces.
The rotary table press $a_4$ works with an upper ram $b_4$ and a lower ram $c_4$. Between these rams the two rotary brushes $e_4$ are arranged journalled in a frame $d_4$. This frame oscillates around a stud $f_4$ and it can be locked in its position, for instance by pressure screws $g_4$ or the like which project through oblong holes of the casing for the bevel wheels, and are screwed into corresponding internally threaded bores in the front wall of the frame $a_4$. When the brushes are moving the frame $a_4$ is rotated until the brushes are in the desired position, whereupon the pressure screws $g_4$ are screwed home. The brushes $e_4$ are rotated by a bevel gear $h_4$ and spur wheel gear $l_4$.

The pressed plates are removed from the permanently rotating mould table by an automatically acting removing device. The pressed bodies ejected in upward direction are stopped by a stationary abutment bar, not connected with the rotary table, at the rotation of the press table plate and removed by catches of a circulating endless chain from the rotating mould table and delivered to a conveying band or the like which conveys the same to the discharge point.

Figure 32:
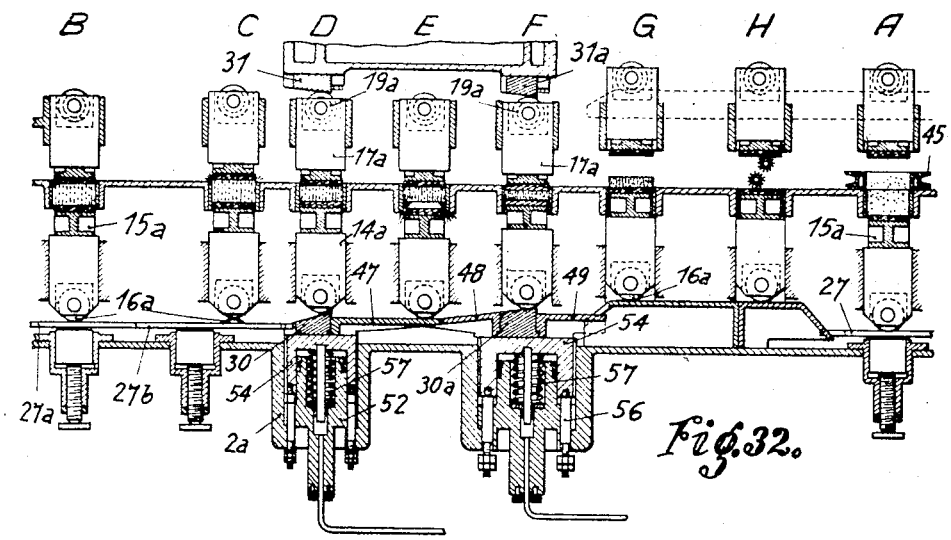
Fig. 32 is a developed vertical section of the press.

To clean the pressed bodies from dust and the like a rotating brush may be arranged above the conveyer band.
In the diagrammatical Fig. 32, which shows diagrammatically the guide path of the rotary table press in developed state, the filling of the mould 45 takes place in the position A, the first preliminary pressing takes place in the position B, the first de-aerating in the position C as the moulded body is slightly pressed out of the mould as described with reference to Figs. 1 to 8. In the position D the second preliminary pressing takes place, in the position E the second de-aerating in downward direction, and in the position F the final pressing. In the position G the mould body is ejected in upward direction, the cleaning of the ram surfaces taking place in the position H by means of the brush device described. The press pieces 30 and 30$a$ for the second preliminary pressing (D) and for the third final pressing (F) are yieldably mounted in such a manner that, for instance the lower pressing element, can yield in downward direction at a predetermined resistance, as will be further explained hereinafter.
The rollers 16$a$ of the lower ram 15$a$ run on segment-shaped guide-path elements 27$a$, 27$b$, 47, 48, 49 and 27, which do not simply join each other but engage at the point of contact by a tongue-shaped projection 60 or the like with corresponding grooves 61 of the adjacent segment piece (see Figs. 34 and 35). Owing to this arrangement vibrations and shocks are avoided and a steady movement is ensured at the joints of the guide path pieces at the passing of the rollers 16a, which are of the same width as the guide path rails.

Figure 33:
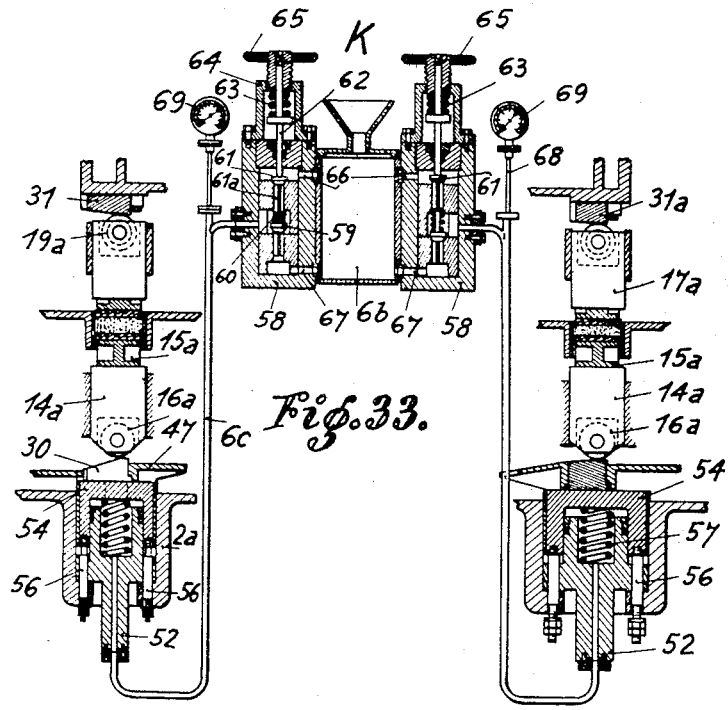
Fig. 33 is a vertical section of the positions D and F of Fig. 32.

The yieldable mounting of the lower ram 15a, which might be called "pressure equalization device", is arranged under the piston (see positions D and F) and serves to compress the pressing mass in the mould only so much that the pressure in the pressure equalization device escapes. This pressure is however adjustable at will according to the invention. The pressing pressure might thereby be adjusted or regulated according to the material used. The arrangement for this purpose is constructed in the manner which will be hereinafter described and which is shown in Figs. 32 and 33. The upper press piece 31 is fixed in the upper transverse bar, while the lower press piece 30 (position D) is yieldable, i. e. arranged so that it can yield in downward direction.

The piston-like structure 52 is fixed in a bore of the lower transverse bar 2a and is bored for the admission of the pressure water. The bore is enlarged for the reception of a spring 57. On the piston 52 the movable head piece 54 is guided, which is held by screws 56. The nuts or the screws 56 might be adjusted for limiting the stroke. The spring 57 put under tension presses the head piece 54 permanently in upward direction. When the pressure roll 19a of the piston 17a is descending on the inclined face of the press piece 31, the piston is pressed from above into the filled mould. At the same time the piston 14a, owing to the wedge piece 30, is forced to ascend and to penetrate from below into the filled mould. If the resistance between the two press pieces 30 and 31 becomes greater than the resistance of spring 57, the movable head piece 54 with the press piece yields in downward direction. This occurs as soon as the rollers 16a and 19a slide down on the intermediate path 47. If, however, pressure liquid is in the space between cylinder 57 and the piston 52, the yielding of the press cylinder will take place only when the resistance between the press pieces 30 and 31 becomes greater. Herefrom results, that according to the height of the counterpressure produced by compressed pressure liquid the pressing material in the press mould will be more or less strongly compressed. To produce the counterpressure in the hollow space between 54 and 52 serves the device K, shown in Fig. 33. On the container 6b for the pressing water a valve case 58 is fixed, which communicates with the container 6b by two channels 66 and 67. The suction valve 59, loaded by a spring 60 and ensuring the closing of the valve, is mounted in the casing 58. The pressure valve 61 is at the top end, and it is guided in the valve seat 61a. In the head piece 64 mounted on the casing 58 a hand wheel 65 is mounted adapted to be screwed up and down, which acts upon the loading-pin 62 of the pressure-valve 61. A spring 63, mounted on a collar of the loading pin strikes with its upper end against the hub of the hand wheel. By regulating the spring 63 by means of the hand wheel the loading of the pressure valve 61 is varied. A pressure gauge 69 is connected to the pipe conduit.

The left portion of the Fig. 33 shows the position at the preliminary pressing with open suction valve 59. Suppose that at the starting of the press the hollow space between 54 and 52 contains not yet any pressure liquid, the resistance between 30 and 31 will, after overcoming the counterpressure produced by the tension of spring 57, press in downward direction the movable head piece 52 with the press piece 30. When the pressure rollers 16a and 19a have slid over the press pieces 30 and 31, the head piece 54 no longer encounters any resistance. It will return into its initial position by the action of the spring 57. A vacuum is, however, hereby produced in the hollow space between 54 and 52, whereby the valve 59 is raised. As indicated by the arrow-line, the pressure liquid will now penetrate through the tube 60 into the hollow space between 54 and 52. As soon as the head piece 54 can no longer ascend, the suction valve 59 closes. At the following pressing operation the resistance produced between 30a and 31 can be suppressed only by further compression of the pressure material in the mould or by the yielding in downward direction of the lower head piece 54 with the press piece 30a. When the compressed material in the press mould does no longer yield, the head piece must yield in downward direction, this being possible however only if it displaces the pressure liquid which is in the hollow space, this being however impossible. The yielding head piece 54 must consequently compress the pressure liquid. This compressed pressure liquid can however return into the container 6b, by lifting the loaded pressure valve 61. This position is shown in the left hand portion of Fig. 33. The pressure liquid will be more or less loaded according to how the spring 63 on the pressure valve 61 is regulated, and the liquid will more or less compress until it is capable to raise the pressure valve 61. By compressing or expanding the spiral spring 63 with the aid of the hand wheel 65, it is possible, to make the compressed pressure water escape only at a predetermined pressure step. As the conduit 68 of the pressure gauge 69 communicates with the pressure and suction pipe, the pressure gauge will indicate the pressure produced in kilograms per square centimeter of the piston surface. By this arrangement it is possible, to press each body with the same pressure.

I claim:—

1. A process for making pressed bodies of powdery material by subjecting the material to repeated pressing and de-aerating the moulded body by exposing a portion of the surface of the body being moulded to atmospheric pressure between the pressing operations by partly ejecting the body from the mould.

2. A process for making pressed bodies of powdery material in open-ended moulds, which comprises alternately pressing the material from opposite ends of the moulds and exposing the opposite ends of the body to atmospheric pressure between the pressing operations.

3. A process for making pressed bodies from powdery material which comprises distributing the material in open-ended moulds in accordance with the surface configuration of the body to be produced for uniform density, alternately compressing the material from opposite ends of the mould and ejecting the body partly from the mould after each pressing operation to expose it to atmospheric pressure.

4. A process for making pressed bodies from powdery material which comprises distributing different sizes of material in layers in moulds, repeatedly pressing the material and exposing the body to atmospheric pressure between pressing operations.

5. A process for making pressed bodies from powdery material which comprises distributing different sizes of material in layers in moulds, repeatedly pressing the material and exposing the body to atmospheric pressure between pressing operations by forcing the body partly from the mould.

6. A process for making pressed bodies from powdery material which comprises, feeding the material to the moulds at successive stages, separating the material into different sizes as it proceeds to a stage and delivering the coarser material to the material proceeding to the mould at another stage repeatedly pressing the material and exposing the body to atmospheric pressure after each pressing operation.

7. A process for making pressed bodies from powdery material which comprises, feeding the material to the moulds at successive stages, separating the material into different sizes as it proceeds to a stage and delivering the coarser material to the material proceeding to the mould at another stage repeatedly pressing the material and exposing the body to atmospheric pressure after each pressing operation by partly ejecting the body from its mould.

8. The process of making pressed bodies from powdery material which comprises grinding an initial material to different sizes, moistening each size separately until a uniform size is obtained, feeding the powdery material into moulds, subjecting the material to successive pressing operations at opposite ends of the mould, and exposing the moulded body to atmospheric pressure after pressing operations.

9. The process of making pressed bodies from ceramic material, which comprises heating the material to loss of plasticity, grinding the material to powder in successive stages, moistening the product of each stage separately until ground to one powdery grade, feeding the powdery material into moulds, repeatedly pressing the material and exposing it to atmospheric pressure after each pressing operation.

10. A rotary table press having upper ram and lower ram comprising in combination a charging hopper, a rotary table plate, moulds in said plate, a charging box above this rotary table plate, scrapers for charging unscreened material for a coarse grained layer directly from said charging hopper to said charging box, a charging box for fine grained material above said rotary plate, a screening drum above said second mentioned charging box for delivering the screened material to said second mentioned charging box, and a conveyor connected to said screening drum for conveying the coarse material from said drum to said first mentioned charging box.

11. A rotary table press comprising in combination with a rotary mould table and pressing rams of a guide path for each pressing ram, composed of several parts each one adjustable in vertical direction so that the filling height of the moulds may be varied.

12. A rotary table press for producing pressed bodies of one or several layers of powderous material, comprising a rotary table, moulds in said table, an upper ram, a charging box above said rotary table, a lower ram under said rotary table in combination with a guide path for said lower ram of such shape that the upward movement of said lower ram resting on said guide path begins when the front edge of the mould in the direction of rotation of the table plate moves away from said charging hopper so that the mass is piled in the mould in accordance with the surface of said guide path and the upward movement of said lower ram ceases when said charging box has arrived on the opposite edge of said mould.

13. A rotary table press comprising the combination with the rotary table plate, moulds in said table plate, and a charging box above said table plate; of means for conducting said charging box so that it carries out over said mould table a closed curved path.

14. A rotary table press comprising in combination with a rotary table plate, moulds in said table plate, a charging box above said table plate; of means for moving said charging box so that it moves over said mould table in closed curved path, said means consisting of a lever for said charging box having a guide slot, a stud engaging in said guide slot and a crank for oscillating said lever around said stud.

15. A rotary table press, as specified in claim 4, in which the charging box carries out, in the direction of movement of said table a more rapid movement than in the opposite direction.

16. A rotary table press, as specified in claim 14, in which the charging box carries out, in the direction of movement of said table, a more rapid movement than in the opposite direction, the means for carrying out the reciprocating movement of said charging box consisting of a box having several different curves, and a cam disc to which said lever is hingedly connected so that said cam disc controls the movement of said charging box.

17. A rotary table press as specified in claim 11, comprising in combination with a stationary piston, a head piece shiftable on said piston, a press plate resting on said shiftable head piece, a container for pressure liquid, suction and pressure valves connecting the pressure space between said piston and said head piece with said container so that the sucked-in pressure liquid is compressed by the descending head piece until it is capable of lifting the pressure valve controlled by adjustable spring pressure and escape.

In testimony that we claim the foregoing as our invention, we have signed our names hereto.

PETER JOSEPH SPENGLER.
JOHANN PETER SPENGLER.